UNITED STATES PATENT OFFICE.

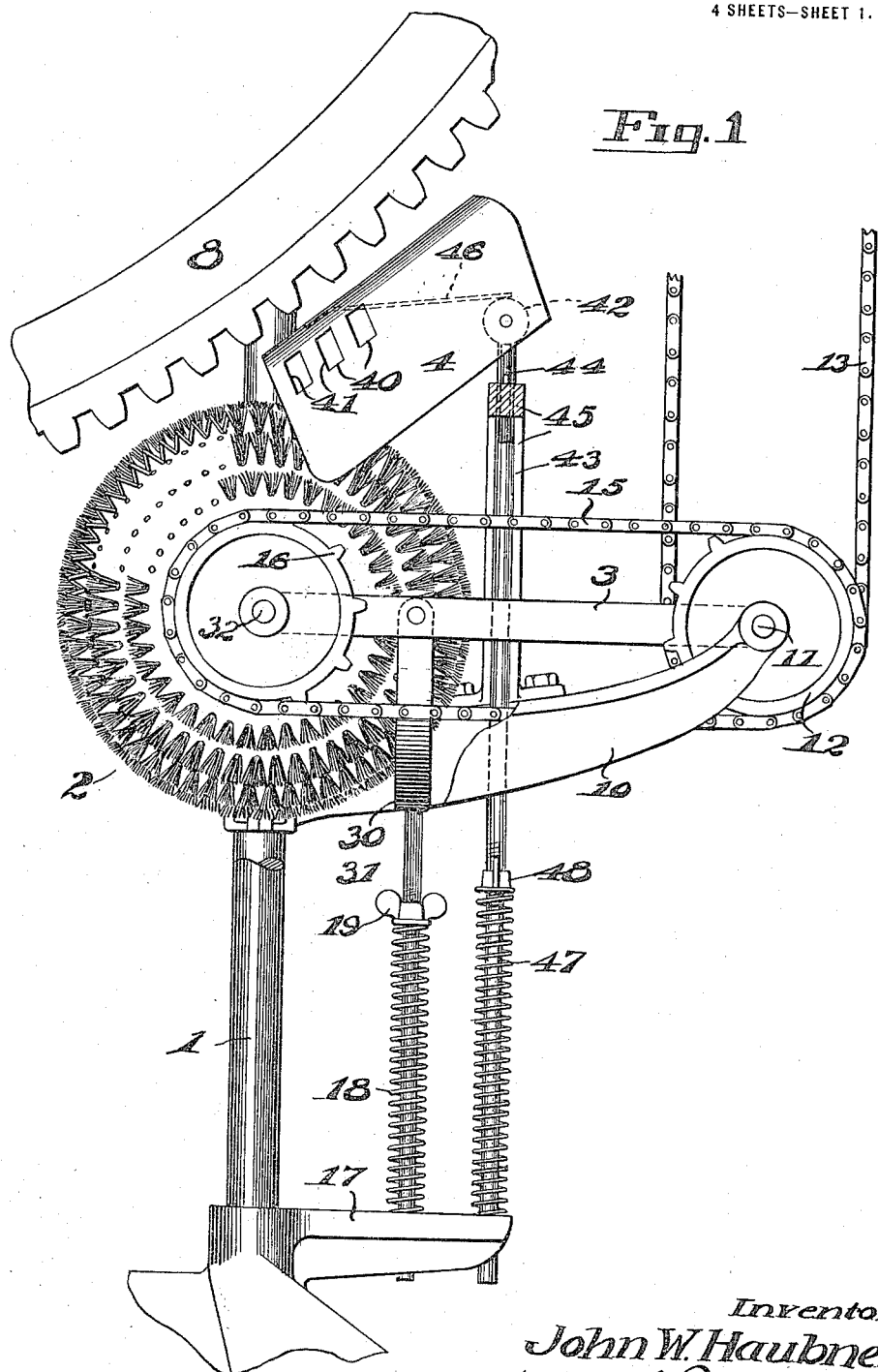

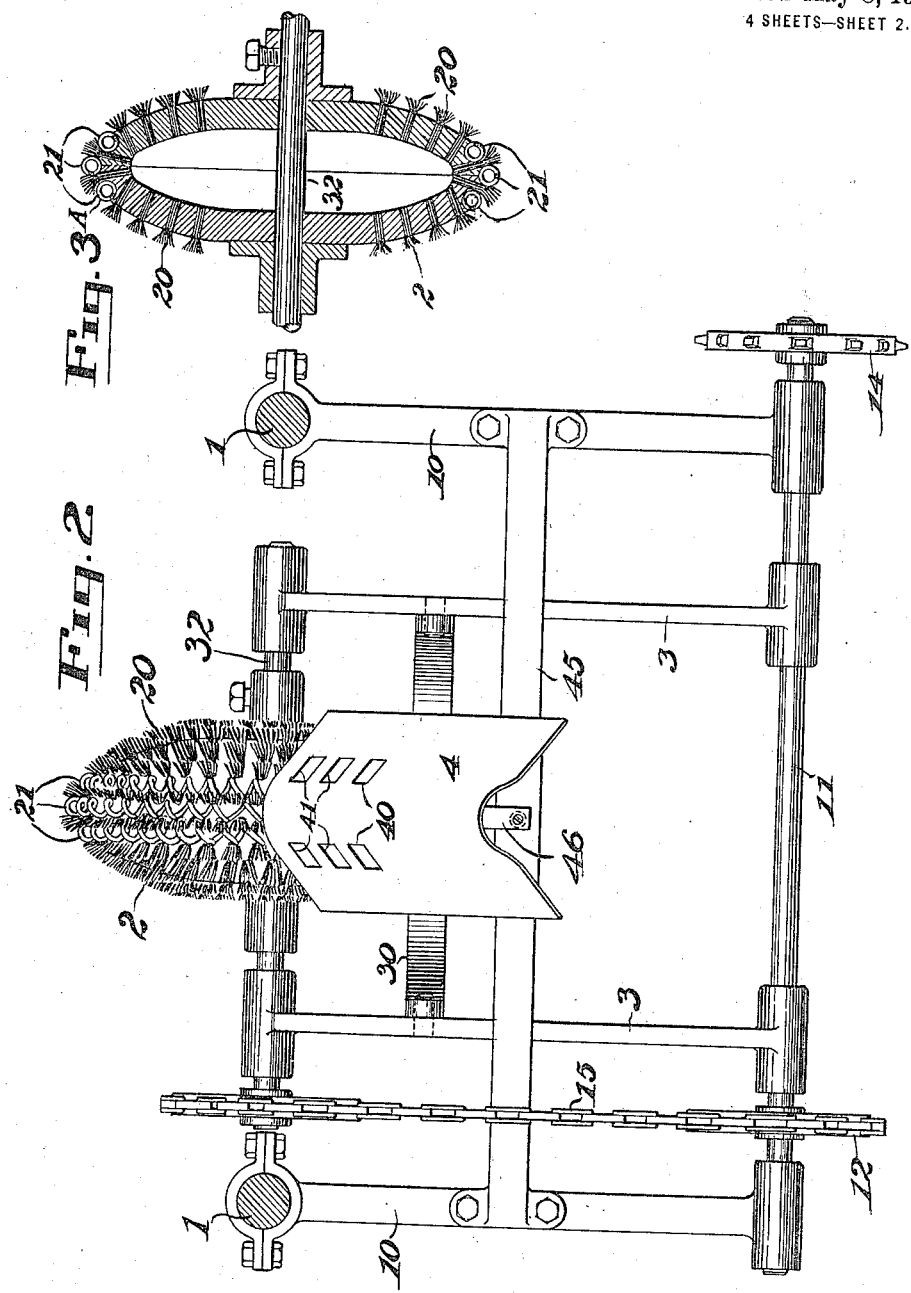

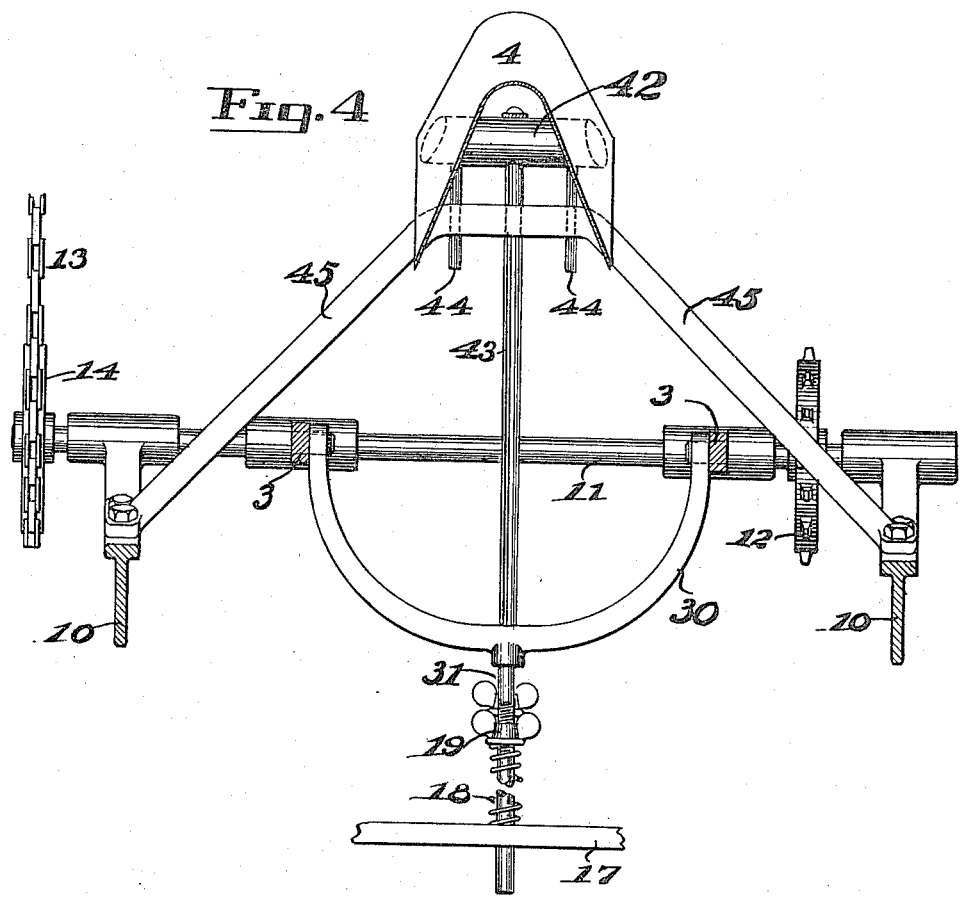
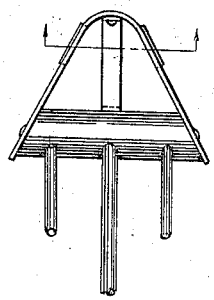
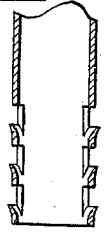

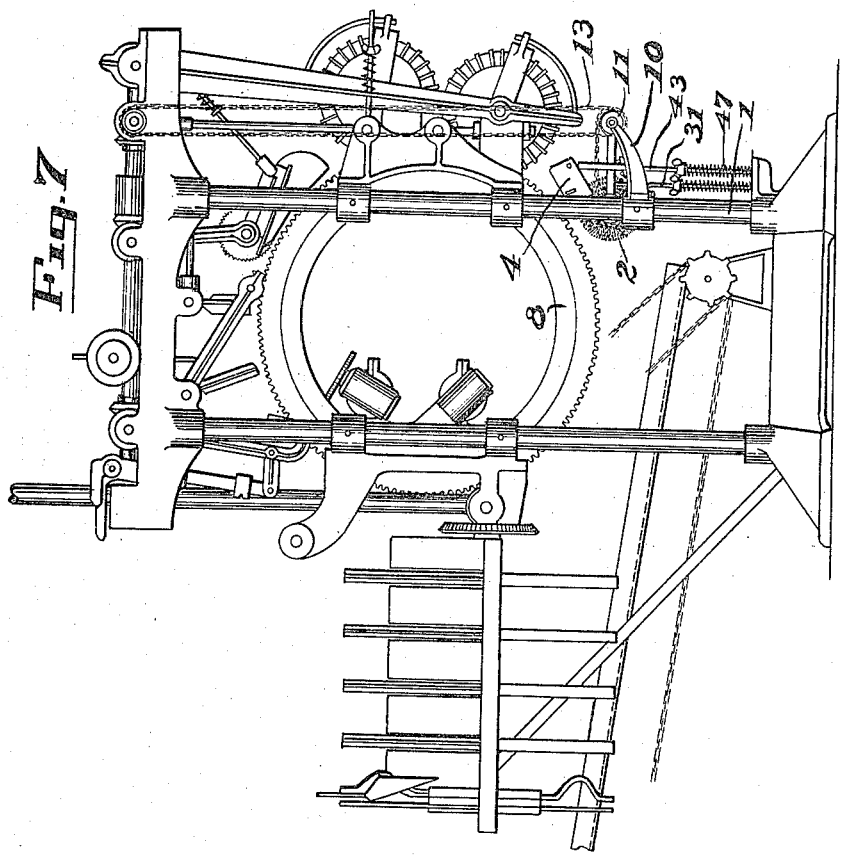

JOHN W. HAUBNER, OF FRIDAY HARBOR, WASHINGTON.

FISH-CLEANING DEVICE.

1,224,923.    Specification of Letters Patent.    Patented May 8, 1917.

Application filed December 28, 1916. Serial No. 139,386.

*To all whom it may concern:*

Be it known that I, JOHN W. HAUBNER, a citizen of the United States, and resident of Friday Harbor, county of San Juan, and State of Washington, have invented certain new and useful Improvements in Fish-Cleaning Devices, of which the following is a specification.

My invention relates to fish cleaning machines and consists of an attachment designed for application to a fish cleaning machine of a standard type and its purpose is to more thoroughly clean out the internal cavity of the fish after it has been operated upon by the other parts.

The object of my invention is to give the cleaning operation a final touch which will more thoroughly clean the fish, particularly of the blood which coagulates in a sac along the backbone, and to remove small particles of skin and objectionable matter from the body of the fish.

My invention consists of the novel parts and combinations of parts which are herein illustrated and described and then particularly pointed out in the claims.

In the accompanying drawings I have shown my invention embodied in a form of construction which is that now most preferred by me.

Figure 1 is a side elevation of my device shown in position upon the fish cleaning machine.

Fig. 2 is a plan view of the same parts.

Fig. 3 is an axial section through the cleaning wheel.

Fig. 4 is a sectional elevation taken through the scraping blade and guide, but with the brush wheel removed.

Fig. 5 is an elevation of the scraping blade, the line of sight being parallel with the top edge thereof.

Fig. 6 is a section taken lengthwise of the scraping blade through the side openings therein.

Fig. 7 shows in side elevation a type of fish cleaning machine on which my invention is mounted and the location thereof with relation to other parts.

In the cleaning of fish of the kinds for which this device is intended, of which salmon is the best representative, a type of machine such as that shown in Fig. 7 is used. Such a machine is well represented by the patent to Smith, No. 998,129 issued July 18, 1911. The particular description of the machine is, therefore, not necessary herein.

In the operation of such a machine the head is first removed from the fish and then in succession, the tail and fins are removed, the fish is slit lengthwise, the entrails removed and the visceral cavity brushed and scraped out. In doing this work on the machine mentioned, the fish is secured to a revolving ring, or rings, 8, with its back inward and is carried about the same with the tail end forward. The position where I contemplate locating my attachment is following immediately after the last devices, which is shown in Fig. 7, and the said patent to Smith.

It is, of course, to be understood that my invention is not limited in any way to use only with this kind of machine, and its illustration therewith is only because this is the machine most generally used for this purpose.

When the fish reaches this point it has been fairly well cleaned, but at times the blood sac, which extends beneath the backbone, often is not thoroughly cleaned out and, in addition, particles of membrane are often found adhering and, in the ordinary operation of machines of this sort, it has been found necessary to give the fish a further cleaning action by hand to insure satisfactory results, before cutting and inserting into cans.

The first part of my invention to engage the fish is the scraping blade 4. This blade is bent as to form two converging sides, joined toward the apex by a rounded central section. The shape and size of this is such as enables it to fit within the sides of the open fish.

This blade is provided at each side with a series of holes 40, these holes having the lower edge 41, or that edge which is facing toward the oncoming fish, slightly forced outward, thus being raised so as to form dull scraping surfaces which engage the interior wall of the fish to scrape off and loosen any attached particles. It may also remove more or less of whatever may be left of the blood sac.

This scraper blade 4 is mounted upon a transverse bar 42, which bar is secured to a vertical bar 43, which latter bar is mounted for vertical reciprocation within an arch-like bar 45, which extends from side to side with its center in an elevated position, its ends being supported in any suitable manner, as by being secured to the arms 10 which are carried by the posts 1 of the fish cleaning machine. The lower end of the rod 43 passes through a fixed member, as a bracket 17, which is supported from the main frame. The scraper blade 4 is held against turning about the bar 43 as a pivot, by short bars or pins 44 which enter guiding holes in the bar 45.

The bar 43 and the scraper blade carried thereby are yieldingly supported by means of a spring 47, which supports the lower end of the bar and which bears upon a nut 48, which is screw threaded upon the rod 43, whereby the tension of the spring and elevation of the scraper blade may be adjusted. A brace bar 46 may be placed inside the scraper blade 4 to better support the same.

The two arms 10 have journaled in their rear ends, a shaft 11 upon which are mounted two sprocket wheels 12 and 14. Upon the sprocket wheel 12 is a chain 13, which extends upward and over a sprocket wheel mounted upon any convenient shaft of the machine. Any other equivalent manner of driving the device may be employed.

Pivoted upon the shaft 11, are two bars 3, which extend forward, or beneath the machine, and at their inner ends have a shaft 32 journaled therein. These bars 3 are connected by a yoke 30 which has a downwardly extending rod 31 which also has its lower end guided in the bracket 17, and which is supported by a spring 18 and an adjusting wing nut 19.

The brush 2, which is mounted upon the shaft 32, has an outer cross sectional shape which is ovoidal, or such as will fit nicely into the open fish. The body of this brush may be of metal or wood, as is found most suitable. The brush herein illustrated is supposed to have a wood body.

This brush wheel has scraping members extending peripherally about its outermost parts, consisting of wires or small rods helically coiled after the nature of a coiled spring, the same being wrapped peripherally about the brush with the ends secured together, as herein shown. Three of these wire brushing members 21, are shown. One of these members 21 is preferably placed in the central plane of the wheel and one at each side thereof. I also prefer to have a row of the bristles 20, or equivalent brushing members placed between the coiled wire brush members 21. The bristle members also extend close to the outer surfaces of the outermost of these coiled wire brushes.

The coiled wire members 21 have a sufficient amount of rigidity to enable them to bear with considerable force. Also, their surfaces are all sufficiently rounded that there is little danger of cutting or tearing the fish. Further, having their outer, or fish-contacting sides consisting of wires which extend approximately across the path of their movement, they will easily embed into any such soft material as the coagulated blood referred to, and will thus be enabled to reach to the bottom thereof and scrape it all out. The central one of these wire brushes will act most effectively in this way. The other or side brushes will, however, act effectively to engage and remove the membrane which forms the outer wall of the blood sac.

The device just described is placed to act last upon the fish carried by the machine. It gives the fish the final cleaning which is given by the machine. Experience has shown that it results in leaving the fish in much better condition than when only the other devices which have heretofore been employed, have been used.

What I claim as my invention is:

1. A rotative fish cleaning wheel comprising a body, flexible brush members projecting therefrom, and a spring-like coiled wire extending peripherally about the said body and coöperating with the flexible brush members to clean the fish.

2. A fish cleaning wheel comprising a rotative body having projecting bristles and a spring-like wire coil embedded in the bristles and extending peripherally about the body in the central plane thereof.

3. A fish cleaning wheel comprising a rotative body having a peripheral outline adapting it to fit within the interior cavity of an opened fish and having bristles projecting outward therefrom, and three spring-like wire coils extending peripherally about the body, said body having seats hollowed therein to receive said wire coils.

4. A fish cleaning device comprising a rotative body having its outer part of ovoidal cross section with shallow grooves extending peripherally about the same at and adjacent to its central plane, spring-like coiled wires seated in said grooves and bristles projecting between said coils and on the flank inwardly of said wire coils.

5. A rotative fish cleaning wheel comprising a body, flexible brush members projecting therefrom, and a spring-like coiled wire extending peripherally about the said body, and constituting a relatively stiff brushing member, and a spring support for said wheel.

6. A rotative fish cleaning wheel comprising a body, a spring-like coiled wire extending peripherally about the said body, flexible brush members projecting from said body adjacent said coiled wire and coöperating therewith to clean the fish, a pivotal frame in which said wheel is journaled and means for yieldingly supporting said frame.

7. A rotative fish cleaning wheel comprising a body, a spring-like coiled wire extending peripherally about the said body, flexible brush members projecting from said body adjacent said coiled wire and coöperating therewith to clean the fish, a pivoted frame in which said wheel is journaled, a rod having supporting connection with said frame, a fixed member acting as a guide for said rod, and a spring yieldingly supporting said rod.

8. In a fish cleaning device, in combination, a plate having inclined sides connected by a rounded section and adapted to fit the visceral cavity of the fish, the sides of said plate having holes therein having their edges which face the oncoming fish slightly forced outward.

9. In a fish cleaning device, in combination, a plate having inclined sides connected by a rounded section and adapted to fit the visceral cavity of the fish, the sides of said plate having holes therein having their edges which face the oncoming fish slightly forced outward, and a yielding support for said plate.

10. A fish cleaning device comprising a rotative brush wheel having a periphery rounded in cross section and coiled wire brushing members extending about its central plane and bristles between and at each side of the coiled wires, a swinging frame in which said wheel is journaled, a scraper having flaring sides joined by a rounded section and yieldingly supported just in advance of the wheel, and a yielding support for the wheel.

Signed at Friday Harbor, Washington, this 20th day of December, 1916.

J. W. HAUBNER.

Copies of this patent may be obtained for five cents each, by addressing the "Commissioner of Patents, Washington, D. C."